132-241 SR
MP414 OR RE 18,749
Search Room
Feb. 28, 1933.
R. D'ORLEANS
HAIR WAVING DEVICE
Re. 18,749
Original Filed April 10, 1929
Orig. 1,835,936
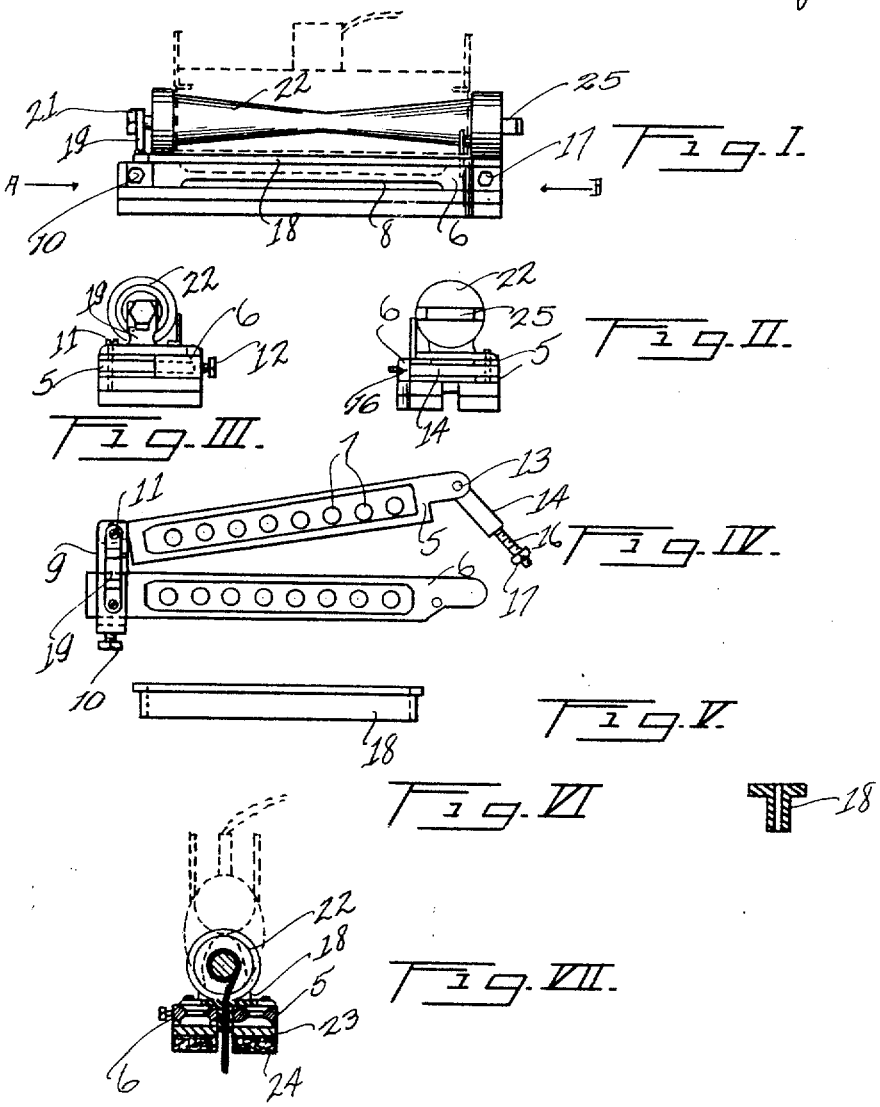
INVENTOR.
R. D'ORLEANS
BY Victor J. Evans
ATTORNEYS.

Search Room 3 vol

Reissued Feb. 28, 1933

Re. 18,749

UNITED STATES PATENT OFFICE

ROBERT D'ORLÉANS, OF SAN FRANCISCO, CALIFORNIA, ASSIGNOR TO WILLIAM H. H. DAVIS, OF SAN FRANCISCO, CALIFORNIA

HAIR WAVING DEVICE

Original No. 1,835,936, dated December 8, 1931, Serial No. 354,025, filed April 10, 1929. Application for reissue filed October 29, 1932. Serial No. 640,301.

This invention relates generally to improvements in hair waving devices and has particular reference to a protector for gripping a strand of hair during a waving operation.

It is an objectof the invention to provide means whereby a perfect seal is formed between the protector and the hair, thus eliminating the danger of steam or hot vapor passing through the same to the scalp.

A further object of the invention is to provide means whereby a secure grip upon a hair strand is afforded.

Another object of the invention is to provide a protector in which the portions which directly engage the hair strand are separable with respect to the remainder of the protector structure.

Other objects and advantages will be apparent during the course of the following description.

In the accompanying drawing forming a part of this specification, and in which like numerals are employed to designate like parts throughout the same, Figure 1 is a side elevational view of hair waving apparatus incorporating the present invention.

Fig. 2 is an end elevation of the apparatus shown in Fig. 1, looking in the direction of the arrow B.

Fig. 3 is an end elevation of the apparatus shown in Fig. 1, looking in the direction of the arrow A.

Fig. 4 is a top plan view of the clamping means utilized with my apparatus, with the curler and rubber seal removed.

Fig. 5 is a side elvational view of the rubber seal utilized with my apparatus.

Fig. 6 is a cross sectional view of the rubber seal on an enlarged scale.

Fig. 7 is a vertical cross section view taken through the entire apparatus as shown in Fig. 1.

At the present time various forms of clamps or protectors are used in order to hold the hair while the permanent wave is being formed therein. These clamps permit a large amount of heat to be radiated or conducted to the scalp, or permit hot vapor generated during steaming of the hair to flow down through the protector and injure the scalp. Either of these may result in discomfort or serious burns which makes permanent waving objectionable.

I have therefore provided means affording heat insulation with respect to the scalp and provison is made for sealing the hair so that the steam cannot escape to the scalp.

At the same time, I have provided a clamp which is adjustable and which operates on either fine or coarse hair.

In the accompanying drawing wherein for the purpose of illustration is shown a preferred embodiment of my invention, the numerals 5 and 6 designate parallel clamping members which are each recessed as shown in Figures 4 and 7 and perforations are caused to pass therethrough which are shown at 7. These perforations, together with an undercut 8 provide for the ventilation as will be hereinafter described. The clamping members 5 and 6 are connected to the slide 9, the clamping member being hinged as at 11 while the clamping member 6 is slidably held in the slide 9 through the medium of a screw 10.

To the opposite end of the member 5 is pivoted as at 13, a hinged latch 14 having a threaded portion 16 upon which a nut 17 is positioned. This construction permits the two members 5 and 6 to be adjusted parallel to each other so that the rubber seal 18 may be effectively clamped there-between. The shape of the rubber seal is best shown in Figs. 5, 6 and 7. It will be noted that it is formed of two elongated side portions which are normally parallel and which have their ends joined together. Furthermore the hair receiving slot afforded by this seal is of a length substantially less than the effective length of the clamping members 5 and 6.

A bracket 19 is carried upon the slide 9 and serves to rotatably position thru the medium of a stud 21, a hair curler or roller 22 which is preferably tapered as best shown in Fig. 1. A lug 25 formed upon the opposite end of the roller is adapted to have a key positioned thereon, for the purpose of rotating the roller.

Secured to the under side of the clamping members 5 and 6, are insulating plates 23 and 24. One of these plates is preferably made of cork or some similar heat resisting substance.

The result of this construction is that when it is desired to place a permanent wave in the hair, a strand of hair is first passed thru the rubber seal 18 and the lower edge of the same is moved into close proximity with the scalp. The two clamping members 5 and 6 are now brought around the rubber and locked to each other, after which the screw 10 and the nut 17 are tightened so as to squeeze the rubber 18 and thereby perfect a tight seal between the rubber and the hair, and thus prevent steam from the hair reaching the scalp and burning the same. A roller is now positioned in the bracket 19 and the end of the hair is loosely wound thereon. By now using a key upon the boss 25 the roller is rotated until the hair is tightly wound upon the roller in the manner shown in Figure 7. In some instances the hair is first wet and the end of the hair is then wound upon the end of the roller for a short distance, and then the roller is engaged in winding position, after which the key is used and the roller rotated until the balance of the hair has been wound tightly upon the roller.

This tightening of the roller, while stretching the hair, will not transmit a pull through to the scalp as is common with many forms of permanent wavers, consequently, the pull upon the hair roots will not cause the suffering now experienced.

The hair is now dampened with the proper chemicals, a small pad is placed over the roller with the hair thereon and the heating clamp shown in dotted lines in Figures 1 and 7 is applied.

When the steam which is generated by the heat starts to escape, the same way pass away into the atmosphere and due to the construction of the clamping members 5 and 6, it will be apparent that air may pass through the under cut 8, thence through the perforations 7, which circulation will prevent any heat from being transmitted to the scalp.

It is to be understood that the form of my invention herewith shown and described is to be taken as a preferred example of the same and that various changes relative to the shape, size, material and arrangement of parts may be resorted to without departing from the spirit of the invention or the scope of the subjoined claims.

I claim:

1. In a device of the character described, a pair of clamping members pivotally and slidably connected one to the other, a T-shaped removably resilient seal adapted to be positioned between said clamping member, a slot formed thru said seal at right angles to said clamping members, means for compressing said T-shaped seal between said clamping members, a bracket carried on said clamping members, a roller rotatably carried in said bracket, insulating members carried on said clamping members and having a greater portion of their length spaced from said clamping members, whereby air circulation may take place between said clamping members and said insulating members, for the purpose specified.

2. In a hair waving device, a pair of elongated clamping members, a rubber seal adapted to receive a strand of hair and to be disposed between said members, and means for forcing said members together upon opposite sides of the seal, said seal being formed of two elongated side portions having their ends joined together.

3. In a hair waving device, a pair of elongated clamping members, a rubber seal adapted to receive a strand of hair and to be disposed between said members, and means for forcing said members together upon opposite sides of the seal, said seal being formed of two elongated side portions having their ends joined together, thereby forming a hair receiving slot terminating short of both ends of the seal.

4. A hair waving device, a pair of elongated clamping members, a rubber seal adapted to receive a strand of hair and to be disposed between said members, and means for forcing said members together upon opposite sides of the seal, said seal being formed of two elongated side portions having their ends joined together, thereby forming a hair receiving slot terminating short of both ends of the seal and of a length substantially less than the length of said clamping members.

5. In a hair waving device, a pair of elongated clamping members, a rubber seal adapted to receive a strand of hair and to be removably disposed between said members, and means for forcing said members together upon opposite sides of the seal, said seal being formed of two elongated side portions of rubber having their ends joined together, thereby forming a hair receiving slot terminating short of both ends of the seal and of a length substantially less than the length of said clamping members.

In testimony whereof, I have hereunto set my hand.

ROBERT D'ORLÉANS.